Figure 1:
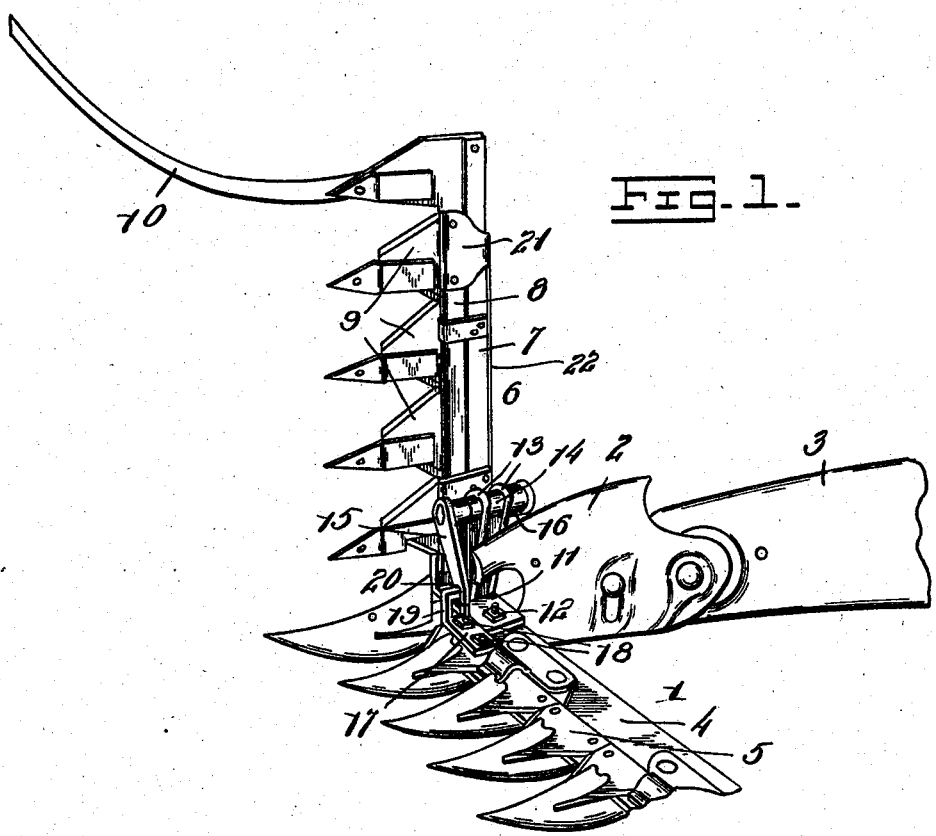

No. 866,917.  
PATENTED SEPT. 24, 1907.  
H. CLIMER.  
SICKLE BAR.  
APPLICATION FILED JULY 5, 1906.

2 SHEETS—SHEET 1.

Witnesses  
L. Armstrong  
C. H. Griesbauer

Inventor  
H. Climer,  
by H. B. Willson & Co  
Attorneys

No. 866,917. PATENTED SEPT. 24, 1907.
H. CLIMER.
SICKLE BAR.
APPLICATION FILED JULY 5, 1906.

2 SHEETS—SHEET 2.

Fig.2.

Witnesses
F. Armstrong
C. H. Griesbauer

Inventor
H. Climer,
by H. R. Wilson & Co.
Attorneys

UNITED STATES PATENT OFFICE.

HERSCHEL CLIMER, OF CHILLICOTHE, OHIO.

SICKLE-BAR.

No. 866,917.      Specification of Letters Patent.      Patented Sept. 24, 1907.

Application filed July 5, 1906. Serial No. 324,819.

*To all whom it may concern:*

Be it known that I, HERSCHEL CLIMER, a citizen of the United States, residing at Chillicothe, in the county of Ross and State of Ohio, have invented certain new and useful Improvements in Sickle-Bars; and I do declare the following to be a full, clear, and exact description of the invention, such as will enable others skilled in the art to which it appertains to make and use the same.

My invention is an improvement in cutting apparatus for mowers, especially adapted for use in mowing peas and clover, but also adapted for other similar purposes, and it consists in the construction, combination, and arrangement of devices hereinafter described and claimed.

In the accompanying drawings,—Figure 1 is a perspective view of a portion of the cutting apparatus of a harvester embodying my improvements; Fig. 2 is partly a rear elevation of the same and partly a section on a line intersecting the divider shoe or runner.

For the purposes of this specification, I show the outer portion 1 of the cutting apparatus of a mower of ordinary construction, the outer shoe or runner 2 and a portion of the arm 3, to the front end of which said shoe or runner is attached. In the cutting apparatus, the finger bar is indicated at 4, and the reciprocating cutter bar is indicated at 5. At the outer end of the cutting apparatus 1, I provide a vertically-disposed cutting apparatus 6, the function of which is to make a vertical cut through the material being mowed at the outer side of each swath to effect a distinct and efficient division between the mowed and the standing peas, clover or other crop, and avoid the tangling of the same which results from an inefficient division and separation between the mowed and the standing crop. The said vertically-disposed dividing cutting apparatus comprises essentially a vertically-disposed finger bar 7, and a vertically-acting cutter bar 8 having the cutter plates 9. At the upper end of the finger bar 7, and extending forwardly and upwardly therefrom, is a curved guard or divider arm 10. In an angle between the lower portion of the vertical finger bar 7 and the outer portion of the horizontal finger bar 4 is a right-angular bracket 11, which is bolted to the said finger bars, as at 12. The said bracket is formed with bearings 13 for a rock-shaft 14. A rock-arm 15 is keyed or otherwise firmly secured to the front end of said rock-shaft, and a similar rock-arm 16 is similarly secured to the rear end thereof at an angle of about ninety degrees with reference to said arm 15. On the cutter bar 5 on the outer end thereof is a right-angled arm 17, which is bolted thereto, as at 18, and is provided with an upwardly-extending portion 19, which operates in a slot 20 in the said arm 15.

It will be understood that the reciprocatory motion of the finger bar 5 will communicate oscillating motion to the shaft 14 and the arms 15 and 16 through the connections 19, 20, hereinbefore described.

The vertically-disposed finger bar 9 of the dividing cutter mechanism is provided at its upper end with a rearwardly and outwardly-extending angle-arm 21. A pitman 22 is pivotally connected to the said angle-arm and to the arm 16, and it will be understood that the oscillating movement of the said arm 16 will, by the said connections 21, 22, cause reciprocating motion to be imparted to the cutter bar 9 and the cutter plates thereon.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention, as defined by the appended claims.

Having thus described my invention, what I claim as new, and desire to secure by Letters-Patent, is,—

In combination with a horizontally disposed cutting apparatus and a vertically disposed cutting apparatus, each having a finger bar and a cutter bar, means connecting said finger bars and supporting the vertical cutting apparatus, a rock shaft having its bearings in the angle between said finger bars and having rock arms at its front and rear ends, disposed at an angle to each other, the front rock arm having a slot, an arm on the cutter bar of the horizontal cutting apparatus and having an upwardly extending portion engaging said slot, and a pitman connecting the rear rock arm to the cutter bar of the vertically disposed cutting apparatus, substantially as described.

In testimony whereof I have hereunto set my hand in presence of two subscribing witnesses.

HERSCHEL CLIMER.

Witnesses:
    R. ENDERLIN,
    JOHN H. GREENBAUM.